United States Patent
Lampinen et al.

(10) Patent No.: US 7,601,189 B2
(45) Date of Patent: Oct. 13, 2009

(54) FILTRATION METHOD AND A FILTER DEVICE FOR REMOVING IMPURITIES FROM THE AIR OF A LIMITED SPACE AND AN APPARATUS FOR REMOVING CARBON DIOXIDE FROM THE AIR OF AN AIR-RAID SHELTER

(75) Inventors: Markku Lampinen, Espoo (FI); Tomi Anttila, Helsinki (FI); Keijo Rauhala, Turku (FI)

(73) Assignee: Oy Hydrocell Ltd., Jarvenpaa (FI)

( * ) Notice: Subject to any disclaimer, the term of this patent is extended or adjusted under 35 U.S.C. 154(b) by 197 days.

(21) Appl. No.: 10/555,993

(22) PCT Filed: May 13, 2004

(86) PCT No.: PCT/FI2004/000290

§ 371 (c)(1),
(2), (4) Date: Nov. 7, 2006

(87) PCT Pub. No.: WO2004/101113

PCT Pub. Date: Nov. 25, 2004

(65) Prior Publication Data

US 2007/0089605 A1 Apr. 26, 2007

(30) Foreign Application Priority Data

May 13, 2003 (FI) .................................. 20030717
Aug. 28, 2003 (FI) .................................. 20031207

(51) Int. Cl.
*B01D 53/02* (2006.01)
(52) U.S. Cl. ............................ 55/385.3; 55/471; 96/130; 96/139; 96/143; 96/144; 96/108; 96/134; 96/135; 96/140; 96/141; 96/142; 422/122; 422/171; 422/173; 423/239.1; 423/244.09; 165/61; 454/158; 95/139; 95/148

(58) Field of Classification Search ................. 55/385.1, 55/385.3, DIG. 30, 385.2, 467, 471; 96/130, 96/139, 143, 144, 108, 134, 135, 140, 141, 96/142; 422/122, 171, 173; 423/239.1, 244.09; 165/61; 454/158; 95/139, 148
See application file for complete search history.

(56) References Cited

U.S. PATENT DOCUMENTS 4,530,817 A * 7/1985 Holter et al. ................ 422/122

(Continued)

FOREIGN PATENT DOCUMENTS

EP 0 736 403 A2 10/1996

(Continued)

*Primary Examiner*—Duane Smith
*Assistant Examiner*—Minh-Chau T Pham
(74) *Attorney, Agent, or Firm*—Kubovcik & Kubovcik (57) ABSTRACT

A filtering method and a filter device (10) for removing impurities from the breathing air (24) in a room, an air raid shelter or a vehicle. According to the filtering method, the air to be filtered is driven through a carbon dioxide filter (13) by a fan (15), with the result that at least a portion of the carbon dioxide and/or mold spores and other impurities in the air are trapped in the carbon dioxide filter. After the filtering, the filter is regenerated and the carbon dioxide and/or mold spores trapped in it are removed by a technique whereby air heated by a thermal resistor (20) is passed through the filter, this air preferably consisting of the same air to be filtered.

24 Claims, 6 Drawing Sheets

U.S. PATENT DOCUMENTS

| | | | |
|---|---|---|---|
| 5,061,455 A | 10/1991 | Brose et al. | 422/122 |
| 5,853,438 A * | 12/1998 | Igarashi | 55/302 |
| 6,120,583 A * | 9/2000 | Saito et al. | 95/278 |
| 6,199,397 B1 | 3/2001 | Khelifa et al. | 62/317 |
| 6,375,695 B2 * | 4/2002 | Machida et al. | 55/282.3 |
| 6,989,048 B2 * | 1/2006 | Bardon et al. | 95/278 |
| 7,163,574 B2 * | 1/2007 | Bause et al. | 96/134 |
| 2002/0056373 A1 | 5/2002 | Fielding | 96/108 |
| 2002/0078828 A1 * | 6/2002 | Kishkovich et al. | 96/108 |
| 2003/0164093 A1 * | 9/2003 | Brownell et al. | 95/268 |
| 2003/0209146 A1 * | 11/2003 | Tsuda et al. | 96/101 |
| 2008/0184882 A1 * | 8/2008 | White | 95/117 |

FOREIGN PATENT DOCUMENTS

| | | |
|---|---|---|
| FR | 2 744 375 A1 | 8/1997 |
| FR | 2 819 451 A1 | 7/2002 |
| GB | 944669 | 12/1963 |
| JP | 5-96117 | 4/1993 |

* cited by examiner

FILTRATION METHOD AND A FILTER DEVICE FOR REMOVING IMPURITIES FROM THE AIR OF A LIMITED SPACE AND AN APPARATUS FOR REMOVING CARBON DIOXIDE FROM THE AIR OF AN AIR-RAID SHELTER

This application is a 371 of international application PCT/FI2004/000290, which claims priority based on Finnish patent application Nos. 20030717 filed May 13, 2003, and 20031207 filed Aug. 28, 2003, which are incorporated herein by reference.

SUBJECT OF THE INVENTION

The present invention relates to a filtering method for removing impurities from the air of a limited space, such as a room, an air raid shelter or a vehicle, according to which filtering method
- the air to be filtered is passed through a filter, whereby at least a portion of the impurities in the air is trapped in the filter, and
- after the filtering, the filter is regenerated, i.e. the impurities collected in the filter are removed by passing a gaseous regenerating medium through the filter.

PRIOR ART

It is known that when breathing a human being uses up oxygen in the air and replaces the oxygen with carbon dioxide at a rate of about 5 ml/s. A slight increase in the carbon dioxide content of the breathing air causes the people in the room to feel tired. Larger amounts of carbon dioxide may even be hazardous to health. Therefore, rooms where people have to stay must be provided with sufficiently effective ventilation to keep the carbon dioxide content at a sufficiently low level. The carbon dioxide produced by breathing is removed by ventilation by removing the air containing carbon dioxide and supplying fresh oxygen-containing air to replace it.

Indoor air often also contains particulate impurities, such as e.g. mold spores, which are also unhealthy for people, causing hypersensitivity, allergy or asthma. Likewise, the particles contained in tobacco smoke are harmful when breathed. Therefore, this type of solid impurities should also be removed from indoor air by ventilation or in some other way.

Prior-art devices for the purification of indoor air are described e.g. in specifications EP 0736403 A2, FR 2744375 A1, FR 2819451 A1 and U.S. Pat. No. 6,199,397 B1. These specifications describe devices in which air is circulated through an active carbon filter. An active carbon filter can be used to remove e.g. smells and other impurities from the air, but it can not remove carbon dioxide.

However, there is not always sufficient ventilation of indoor air, or replacement of breathing air may even be impossible. For example, in closed spaces, such as air raid shelters, submarines or spaceships, there is no fresh air available, so the same air has to be reused. To keep the air continuously breathable, the carbon dioxide produced in the air when breathed has to be removed from it. However, the equipment constructed for this type of special situations are very expensive and their use often requires complicated special measures. Therefore, such arrangements can not be used in conventional rooms.

A prior-art solution for removing carbon dioxide is to use carbon dioxide filters, which are either disposable or reusable after regeneration of the filter. According to a prior-art method, the carbon dioxide filter can be regenerated, i.e. the carbon dioxide can be removed from it by passing a gaseous medium through it A known gas used for the regeneration of a carbon dioxide filter is e.g. pure water vapor.

As the arrangements needed for efficient conventional ventilation of indoor air are expensive, especially if the replacement air to be supplied into the room has to be previously heated, the efficiency of ventilation is often compromised to avoid high heating expenses. As a consequence, e.g. in schools or other assembly rooms, the carbon dioxide content of breathing air may become so high that the pupils or participants to the meeting begin feeling tired. Since this results in a substantial deterioration of learning efficiency, it would be reasonable to remove carbon dioxide from the indoor air. However, there are no known methods or devices that would make this easy and economical.

OBJECT OF THE INVENTION

The object of the present invention is to overcome the above-described drawbacks and achieve a new filtering method for removing gaseous and/or particulate impurities from indoor air.

Features of the Filtering Method

The filtering method of the invention is characterized in that
- the air to be filtered is passed through a carbon dioxide filter, so that at least a portion of the carbon dioxide in the air is trapped in the filter, and
- after the filtering, the carbon dioxide filter is regenerated, in other words, the carbon dioxide trapped in the filter is removed by a technique whereby air that, prior to being fed into the filter, has been heated to a temperature of 50-200° C., preferably to a temperature of 70-80° C., is passed through the filter.

Embodiments of the Filtering Method

A preferred embodiment of the filtering method of the invention is characterized in that particles, such as mold spores, cigarette smoke or equivalent, are removed from the air of a limited space, such as a room, an air raid shelter or vehicle, by a technique whereby
- the air to be filtered is passed through a carbon dioxide filter, so that at least a portion of the particles, such as mold spores, cigarette smoke or equivalent, is trapped in the filter, and
- after the filtering, the carbon dioxide filter is regenerated, in other words, the particles, such as mold spores, cigarette smoke or equivalent trapped in the filter are removed by passing through the filter air that, prior to being fed into the filter, has been heated to a temperature of 50-200° C., preferably to a temperature of 70-80° C.

Another preferred embodiment of the filtering method of the invention is characterized in that the carbon dioxide filter is regenerated by a technique whereby the unpurified air of the aforesaid limited space, such as a room, air raid shelter or vehicle, to be filtered is passed through the filter, and that, prior to being fed into the filter, the air has been heated to a temperature of 50-200° C., preferably to a temperature of 70-80° C.

An essential feature of the invention is that the filter powder is regenerated using ordinary indoor air in a heated state. According to the invention, carbon dioxide is trapped in the filter powder at a low temperature, e.g. at an ordinary room temperature of 22-23° C., and released from the filter powder at a higher temperature, such as e.g. 50-200° C. Similarly, mold spores or equivalent are trapped in the same way in the filter powder and they can be removed from the filter by passing air at a higher temperature through it.

According to measurements carried out, a carbon dioxide filter formed mainly from a powdery substance can trap as much as 89-99.6% of the mold spores.

A third preferred embodiment of the filtering method of the invention is characterized in that the filter is regenerated by a technique whereby the heated air passed through the filter from the aforesaid limited space, and together with it the gases released from the filter, such as carbon dioxide and/or particles, such as mold spores, cigarette smoke or equivalent, are removed into outdoor air.

According to a fourth preferred embodiment of the filtering method of the invention is characterized in that the filter is regenerated by a technique whereby the filter is taken into outdoor air and through the filter is passed outdoor air that, prior to being fed into the filter, has been heated to a temperature of 50-200° C., preferably to a temperature of 70-80° C.

Filter Device

The invention also relates to a filter device for removing impurities from the air of a limited space, such as a room, an air raid shelter or a vehicle, said filter device comprising
- a filter
- a first opening for admitting the air of the space to be filtered into the filter,
- a second opening for passing the filtered air back into the air space of the space to be filtered
- an operating device, such as a fan, for driving the air through the filter, and
- a regenerating apparatus for regenerating the filter with a gaseous medium.

Features of the Filter Device

The filter device of the invention is characterized in that
- the filter of the filter device is a carbon dioxide filter, through which the air of the space to be filtered containing gaseous impurities, such as carbon dioxide and/or particulate impurities, such as mold spores, cigarette smoke or equivalent, can be passed,
- that the regenerating equipment of the filter device comprises
- a heating element, such as a thermal resistor, for heating the air,
- a first channel for passing the air to the heating element,
- a second channel for passing the heated air to the carbon dioxide filter,
- an operating device, such as a fan, for setting the heated air in motion through the carbon dioxide filter,
- and an opening for passing the heated air and together with it the gaseous and/or particulate impurities released from the carbon dioxide filter out from the filter device.

Embodiments of the Filter Device

A preferred embodiment of the filter device of the invention is characterized in that the filter device comprises an opening for passing the heated air and together with it the gases and/or particles released from the carbon dioxide filter, such as mold spores, cigarette smoke or equivalent, into outdoor air.

The filter powder preferably consists of an amine or amine compound which is suited for removal of carbon dioxide and which can be regenerated over 5000 times, which in normal use gives the filter device a useful life span of about 20 years. The heating device needed for regeneration may be e.g. a thermal resistor placed inside the filter device. The heated air can be supplied to the filter device from outside the device.

A second preferred embodiment of the filter device of the invention is characterized in that the filter device comprises a valve through which the carbon dioxide filter can be connected either to the aforesaid second opening for passing the filtered air back into the air space of the space to be filtered or to the aforesaid third opening for passing the heated air and together with it the gases and/or particles, such as mold spores, cigarette smoke or equivalent, released from the carbon dioxide filter out from the filter device.

A third preferred embodiment of the filter device of the invention is characterized in that the filter device's opening for passing the heated air and the gases and/or particles, such as mold spores, cigarette smoke or equivalent, released from the carbon dioxide filter into outer air is the same as the opening for passing the filtered air back into the air space of the space to be filtered.

A fourth preferred embodiment of the filter device of the invention is characterized in that, during the regeneration step, the air of the space to be filtered can be passed to the filter via the first opening and the first channel and the heating element.

A fifth preferred embodiment of the filter device of the invention is characterized in that
- the carbon dioxide filter of the filter device is mainly composed of a powdery material, which is a substance capable of trapping carbon dioxide,
- and that, besides the carbon dioxide filter, the filter device comprises an auxiliary filter for pre-filtering the air to be passed to the carbon dioxide filter.

By using an auxiliary filter, it is possible to achieve still more effective filtering of e.g. dust, smells, such as cigarette smell or cigarette smoke, for example in restaurant rooms. The filter device may also be provided with a cooler for cooling the filtered air.

The carbon dioxide filter can be composed from various powder mixtures, the composition of the mixture being determined according to the required use so that it will trap either different gases and/or different particulate impurities.

Device for Removing Carbon Dioxide from the Air of an Air Raid Shelter

The present invention further relates to a device for removing carbon dioxide from the air of an air raid shelter. In this context, air raid shelter refers to both shelters for civil population and shelters used by armed forces, such as e.g. an operational shelter. The device of the invention is preferably intended for use for the removal of carbon dioxide from the air of an air raid shelter in a space where the air raid shelter is substantially air-tightly closed with respect to the environment, in other words, in a space where no replacement air can enter into the air raid shelter from the environment.

Background of the Device

The people staying in the air raid shelter produce carbon dioxide. If the carbon dioxide content in the air raid shelter increases too much, the people in the air raid shelter will perish. For this reason, control of the carbon dioxide content of the air in the air raid shelter is extremely important.

In prior art, carbon dioxide filtering arrangements are known in which the filters contain a regenerable adsorbing material, such as e.g. amine or amine compounds. Amine adsorbs carbon dioxide from the air flow to be purified and passing through the filter, by forming a weak bond with carbon dioxide. The bond is broken by heating the adsorbing material or by reducing the partial pressure of carbon dioxide, with the result that the carbon dioxide is desorbed.

Specification U.S. Pat. No. 5,061,455 discloses an apparatus for removing carbon dioxide from air. The apparatus comprises several beds (filters) containing amine in solid form. In the operation of the apparatus, each bed performs three steps:

- a first step, during which the bed has been fitted to adsorb carbon dioxide from the air flowing through the bed;
- a second step, during which the bed has been fitted to desorb the adsorbed carbon dioxide as the bed comes into contact with a regenerative gas consisting of water vapor, with the result that the water vapor is condensed and forms water on the bed; and
- a third step, during which the bed releases the condensate, i.e. water.

To carry out the above-mentioned steps, the apparatus disclosed in specification U.S. Pat. No. 5,061,455 comprises air supply means for admitting the air to be filtered for removal of carbon dioxide into each bed and air outlet means for delivering from each bed the air from which carbon dioxide has been filtered out The air supply system of each bed is provided with a closeable supply air valve and the air outlet system of each bed with a closeable exhaust air valve. The apparatus is provided with a vapor supply system and each bed is provided with means for supplying water vapor from the steam supply system into the bed and desorbing, i.e. releasing the carbon dioxide trapped in the bed. Each bed is additionally provided with means for removing the carbon dioxide from the bed after the carbon dioxide has been desorbed from the bed. This apparatus is characterized in that it comprises means for removing the condensed water from the bed during the third step of operation of the bed so that the condensed water is vaporized again and the supplied water vapor is thus reusable in the steam supply system. For this purpose, each bed is provided with means for reducing the pressure in the bed so that the water condensed on the surface of the bed is vaporized and the water vapor is removed from the bed into the steam supply system.

A problem with this prior-art apparatus is that it uses water vapor during the different steps of operation, which produces humidity in the space where the apparatus is used. As water vapor is used to clean the beds of carbon dioxide, the beds retain some moisture, which can flow out of the apparatus with the air flowing through the apparatus when the apparatus is filtering carbon dioxide from air.

BRIEF DESCRIPTION OF THE INVENTION

Therefore, the object of the present invention is to develop a device for removing carbon dioxide from the air of an air raid shelter that will solve the above-mentioned problems.

The invention is based on heating the filters to desorb from the filters the carbon dioxide adsorbed in the filters by means of a closed system of circulating a flowing medium, said system extending through the filters. In the following, the flowing medium is called a fluid and it refers in this context to a gas or liquid. Since the solution of the invention uses a closed fluid circulation system, the fluid heated by the heating device and flowing through the filters, such as a first and a second filter, in the closed fluid circulation system and heating the filters can therefore not come into direct contact with the carbon dioxide adsorbing material to be regenerated in the filters. In the solution of the invention, the fluid circulated in the closed fluid circulation system of the filters and heated by the heating device can thus only deliver thermal energy into the carbon dioxide adsorbing material to be regenerated. Therefore, after the regeneration step, there can not remain in the filters of the device of the invention any fluid, such as water, that could drift out together with the air cleaned of carbon dioxide from the filters during the filtering process via the air flow means and into the air raid shelter and produce humidity in the air raid shelter.

The regenerable adsorbing material provided in the first and second filters to trap carbon dioxide preferably but not necessarily comprises amine or an amine compound, which preferably but not necessarily is slightly alkaline and which in a given adsorption temperature range has been adapted to form, depending on the amine or amine compound, e.g. carbonic acid ($H_2CO_3$) from the water ($H_2O$) and carbon dioxide ($CO_2$) present in the air to be filtered and to adsorb the carbonic acid, and which at a temperature above the aforesaid adsorption temperature range has again been adapted to form water and carbon dioxide from the carbonic acid adsorbed in the adsorbing material. Since the adsorbing material binds humidity, i.e. water ($H_2O$), humidity can also be removed from the air of the air raid shelter.

If the regenerable carbon-dioxide-binding adsorbing material in the first and second filters is such that the carbon dioxide in the air flowing through the first and second filters is adsorbed into the adsorbing material in a given adsorption temperature range of the regenerable carbon-dioxide-binding adsorbing material and such that, at a temperature above the aforesaid given adsorption temperature range, the carbon dioxide adsorbed into the adsorbing material in the aforesaid given adsorption temperature range is released from the adsorbing material, the regenerating arrangement preferably comprises a cooling device for cooling the regenerable carbon-dioxide-binding adsorbing material in the first and second filters from a temperature above the adsorption temperature range to a temperature within the adsorption temperature range.

The cooling device has preferably been fitted to cool the fluid and feed the fluid into the closed fluid circulation system extending through the filters. Since the fluid cooled by the cooling device circulates through the filters in the closed fluid circulation system, the fluid cooled by the cooling device can therefore not come into direct contact with the regenerable carbon-dioxide-binding adsorbing material in the filters. Thus, in the solution of the invention, the regenerable carbon-dioxide-binding adsorbing material can only deliver thermal energy to the fluid circulated in the circulation system and cooled by the cooling device. Therefore, after the regeneration step, there can not remain in the filters any fluid that could drift out via the air flow means into the air raid shelter together with the air cleaned of carbon dioxide from the filter during the filtering process and produce humidity in the air raid shelter.

If the regenerable carbon-dioxide-binding adsorbing material in the first and second filters is such that the carbon dioxide in the air flowing through the first and second filters is adsorbed into the adsorbing material in a given adsorption temperature range of the regenerable carbon-dioxide-binding adsorbing material and such that, at a temperature above the aforesaid given adsorption temperature range, the carbon dioxide adsorbed into the adsorbing material in the aforesaid given adsorption temperature range is desorbed from the adsorbing material, the regenerating arrangement preferably comprises purification gas supplying means allowing purification gas to be optionally supplied into the first filter or into the second filter after the heating device has heated the first filter or respectively the second filter to a temperature above the absorption temperature range of the regenerable adsorbing material and the carbon dioxide has been at least partially desorbed from the regenerable adsorbing material and for mixing the carbon dioxide released from the regenerable adsorbing material into the gas, and gas removal means for conducting the carbon dioxide-containing gas out from the first filter or respectively the second filter and further preferably but not necessarily to the outside of the air raid shelter. At the same time, at least a portion of the humidity that may have been adsorbed into the adsorbing material is preferably but not necessarily removed from the air raid shelter to the outside of the air raid shelter.

EMBODIMENT EXAMPLES

In the following, the invention will be described in detail with reference to examples and the attached drawings, wherein

DESCRIPTION OF THE FIGURES

Figure 1:
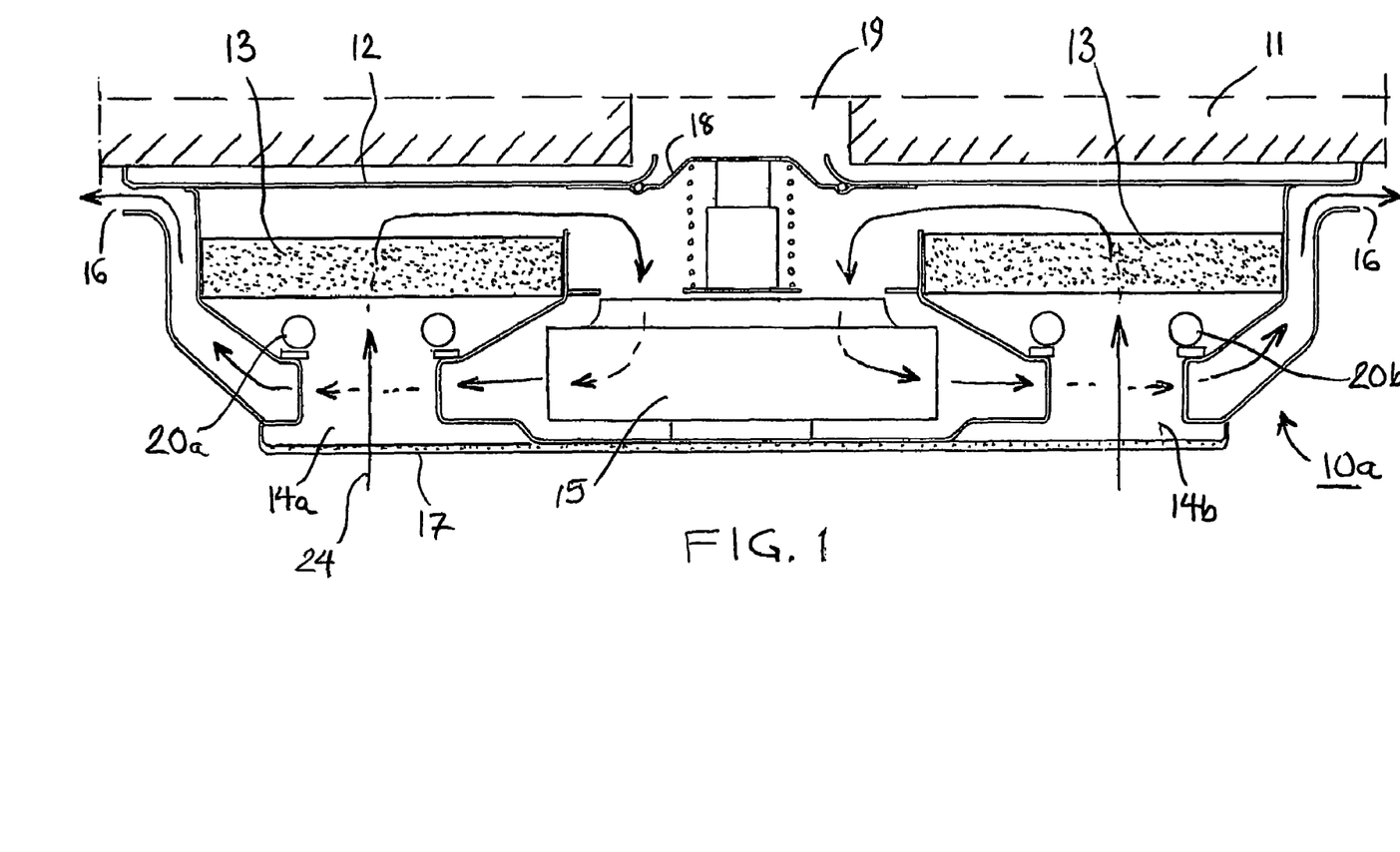
FIG. 1 presents a sectional side view of a filter device according to the invention in a filtering situation.

FIG. 1 presents a room-specific filter device 10a for filtering carbon dioxide and/or mold spores or equivalent, mounted in the ceiling 11 of a room, in sectional view in a filtering situation. In the example presented, the filter device 10a is of a round shape as seen from above, and it has a circular body casing 12 containing a ring-shaped carbon dioxide filter part 13 with a fan 15 at the center. The body casing 12 is provided with several openings 14a and 14b below the carbon dioxide filter 13, with vertical channels in the area of the openings. Through these channels, the fan 15 draws room air 24 to the carbon dioxide filter 13 and further through this filter 13. The carbon dioxide and/or mold spores or equivalent present in the air are thus trapped in the powdery filtering material of the carbon dioxide filter 13. The carbon dioxide filter 13 can preferably trap almost all harmful mold spores, so it may be of major importance to the well-being of the people breathing the filtered air. From the carbon dioxide filter 13, the filtered air flows further within the body casing 12 to the fan 15 and further into a vent 16 provided at the edge of the body casing 12, through which the filtered air is blown back into the room.

As shown in FIG. 1, an auxiliary filter 17 is provided on the lower surface of the filter device 10a in the area of the air inlet openings 14a and 14b to achieve more efficient filtering of solid particles, such as dust, and smells. Placed inside the body casing 12 is a valve 18, which in FIG. 1 is in its high position. In this position of the valve 18, the filtered air drawn through the carbon dioxide filter 13 can be blown by the fan 15 through the vent 16 back into the room.

Figure 2:
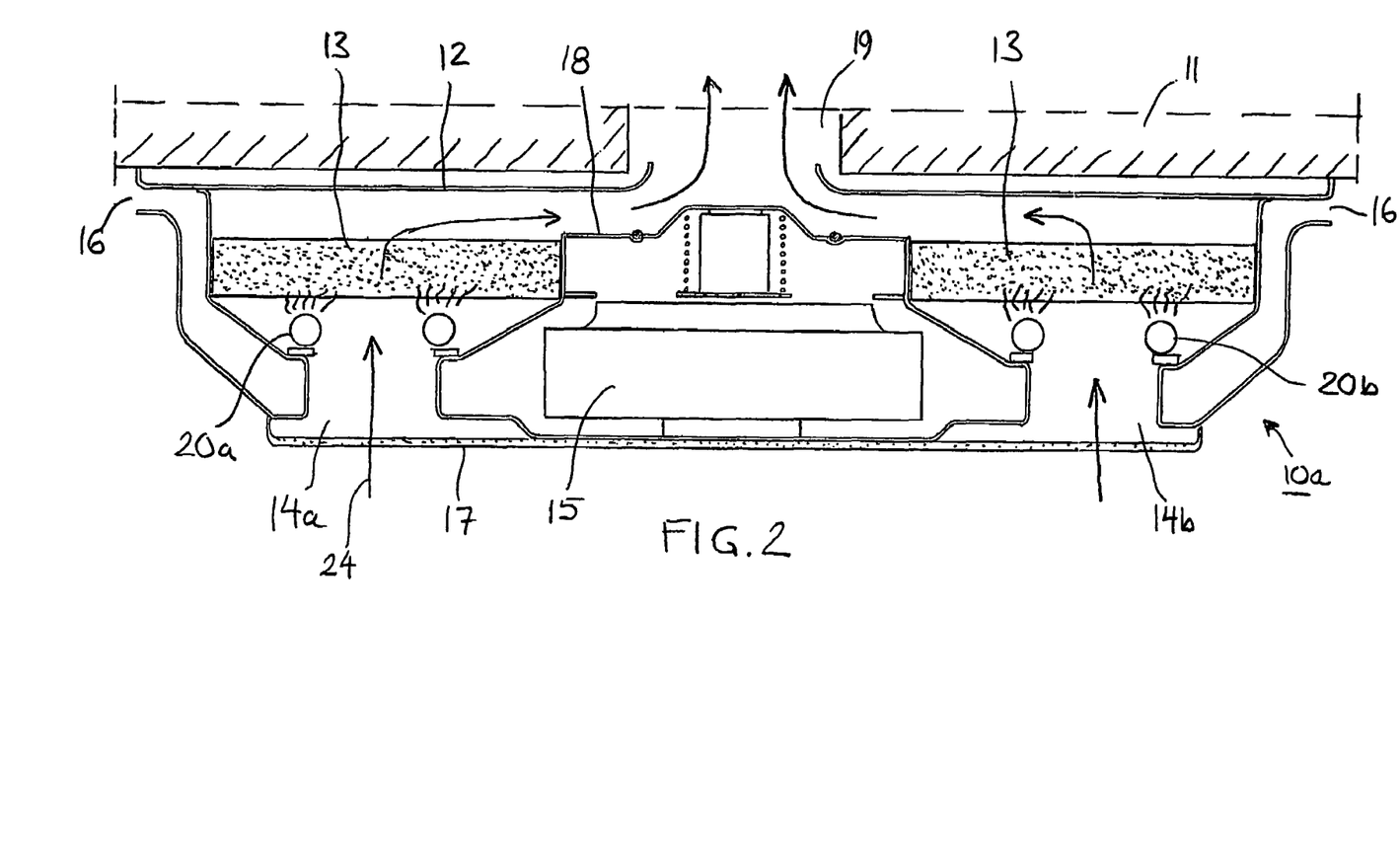
FIG. 2 corresponds to FIG. 1 and presents the filter device in a regeneration situation.

FIG. 2 presents the filter device 10a of FIG. 1 in a regeneration situation, in which the electric resistors 20a and 20b below the carbon dioxide filter 13 are heated. As the valve 18 is simultaneously in its low position, the channel into the air outlet flue 19 is open. The electric resistors 20a and 20b are now heating the room air 24 flowing through the inlet openings 14a and 14b, and the air in turn heats the carbon dioxide filter 13. The carbon dioxide and/or mold spores or equivalent trapped in the filter powder of the carbon dioxide filter 13 are released by the action of the hot air. During the heat treatment, the mold spores are reduced to dust, which is removed from the filter. The velocity of the hot regenerating air flow may be higher than the velocity of the air flow used in the filtering. To achieve more efficient release of the particles from the filter, the velocity of the regenerating air flow can also be varied e.g. in a pulsating manner. The released carbon dioxide and/or mold spores or equivalent are passed into the air outlet flue 19. After the regeneration has been completed, the filtering step illustrated in FIG. 1 can be started again.

Figure 3:
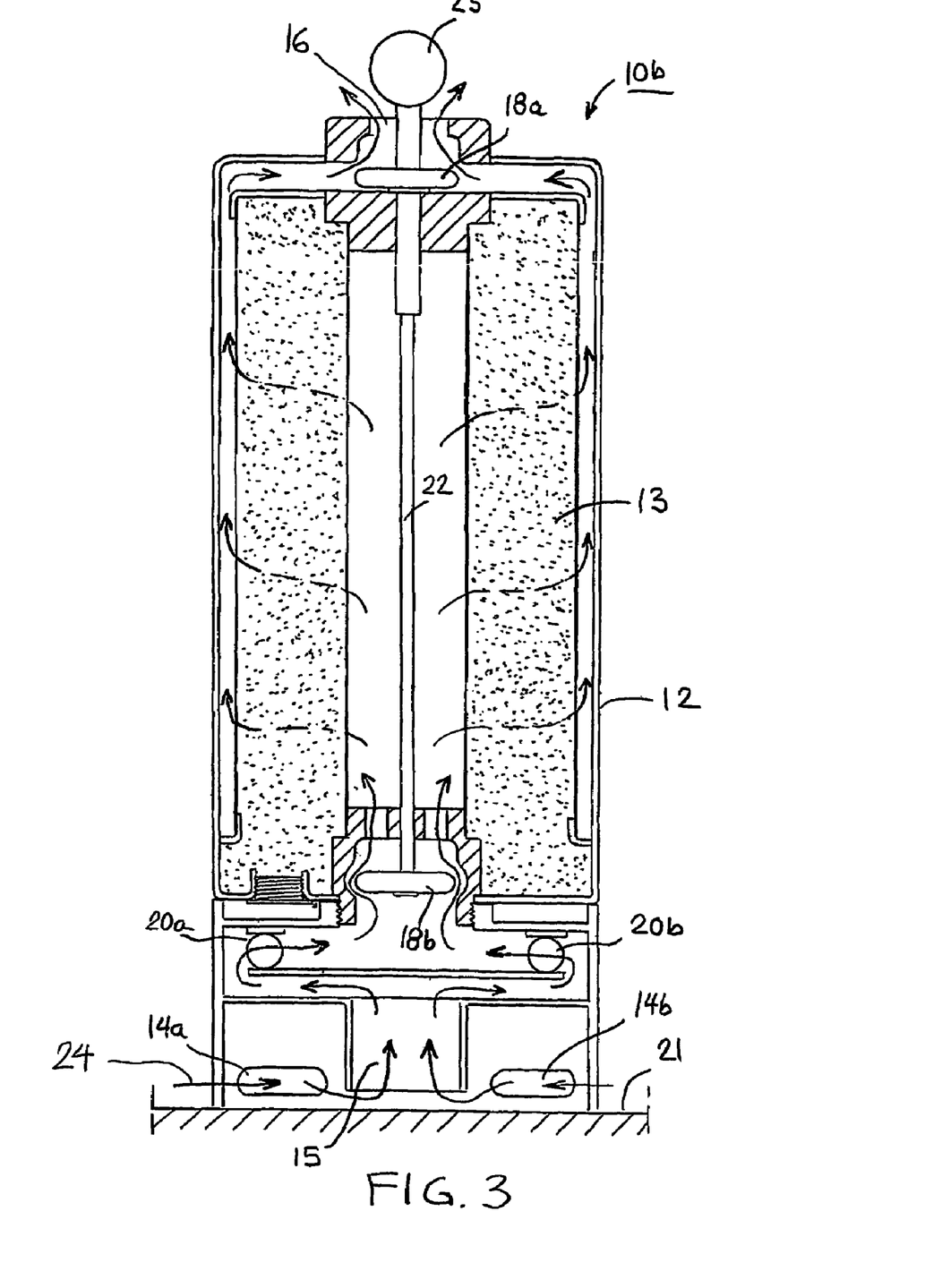
FIG. 3 presents a sectional side view of another filter device according to the invention in a filtering situation.

FIG. 3 presents a smaller filter device 10b according to a second embodiment. This filter device 10b can be regarded as a device for a small room or as a personal filter device and it is intended to be placed e.g. on a table 21. This filter device 10b too has a body casing 12 of a round shape as seen from above and it comprises a ring-shaped carbon dioxide filter 13 and a fan 15.

In the filtering situation illustrated in FIG. 3, the inlet air, i.e. the room air to be filtered is passed through the openings 14a and 14b to the fan 15, which blows the air through a bottom valve 18b into the central hollow of the carbon dioxide filter 13. After that, the air advances to the outer circumference of the carbon dioxide filter 13, from where the filtered room air is removed through an upper valve 18a and a vent 16.

The embodiment presented in FIG. 3 comprises two valves 18a and 18b, which are functionally connected to each other by a rod 22. When a downward pressure is applied to the knob 23 at the upper end of the rod 22, both valves 18a and 18b are opened. The fan 15 is started at the same time, and thus the filtering of carbon dioxide and/or mold spores or equivalent by the filter device 10b is in operation.

Regeneration of the filter device 10b in FIG. 3 is accomplished by connecting power to the electric resistors 20a and 20b. Hot air is thus passed through the carbon dioxide filter 13 and the carbon dioxide and/or mold spores or equivalent trapped in the filter powder are released. As the released carbon dioxide and/or mold spores or equivalent are also removed from the filter device 10b via the vent 16, the filter device 10b has to be taken out from the room for the time required for regeneration so that the carbon dioxide and/or mold spores or equivalent already removed will not return to the same room.

In the embodiment presented in FIG. 3, too, the velocity of the hot regenerative air flow may be higher than the velocity of the air flow used in the filtering. To achieve more efficient release of particles from the filter, the velocity of the regenerative air flow can also be varied e.g. in a pulsating manner. In addition, the direction of the air flow can be varied because it makes no difference in which direction the impurities are removed from the carbon dioxide filter 13. When the air is blown in the opposite direction, it need not be heated. It is sufficient to heat only the air flowing in one direction to regenerate the carbon dioxide filter 13. Blowing in the opposite direction can be utilized to ensure that the mold spores or equivalent disintegrated to dust are removed from the carbon dioxide filter 13.

Figure 4:
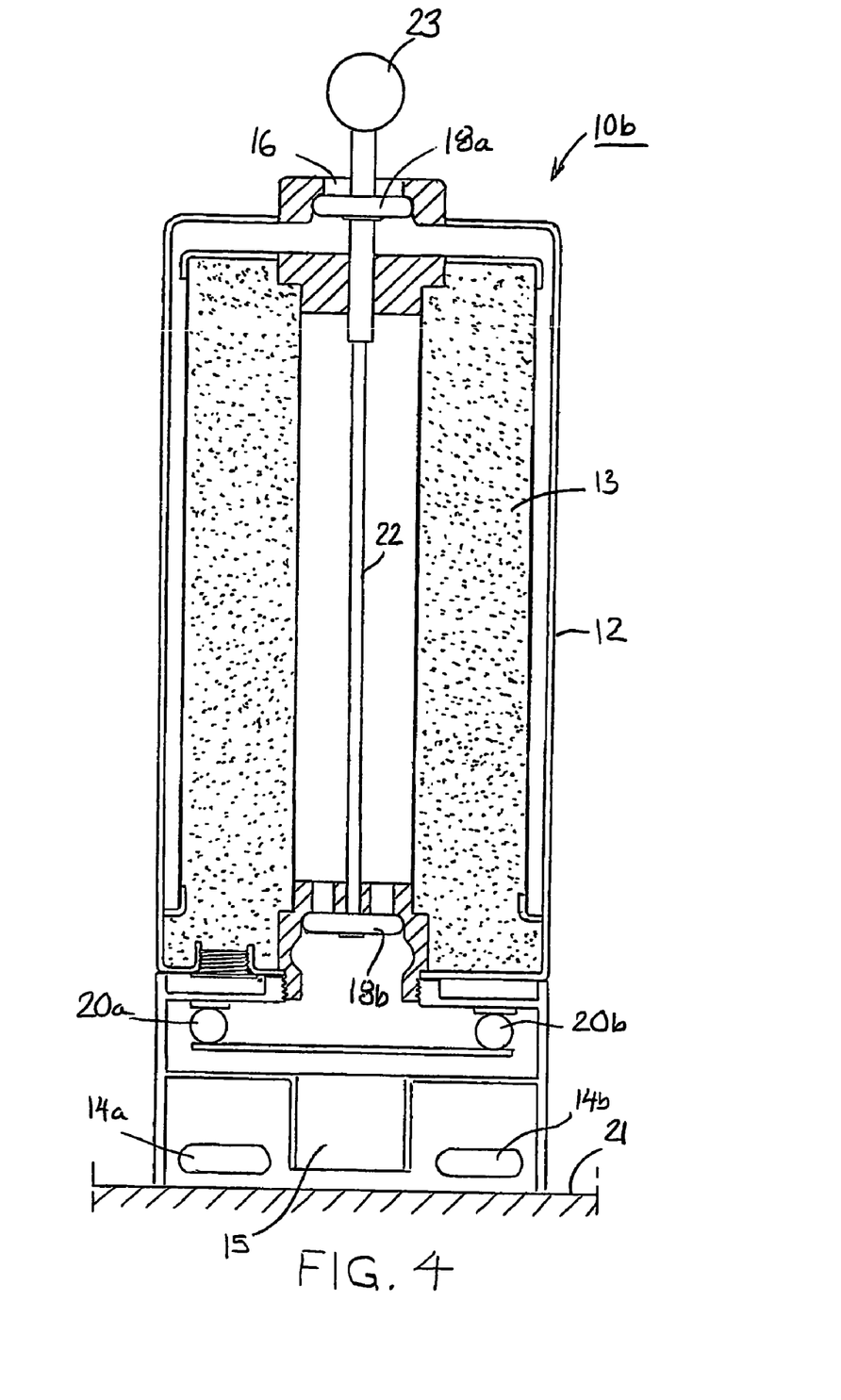
FIG. 4 corresponds to FIG. 3 and presents the filter device in a regeneration situation.

FIG. 4 presents the filter device 10b of FIG. 3 in a shut-off state with operation stopped. The knob 23 has been pulled up, so that the valves 18a and 18b have been closed and the fan 15 stopped.

Figure 5:
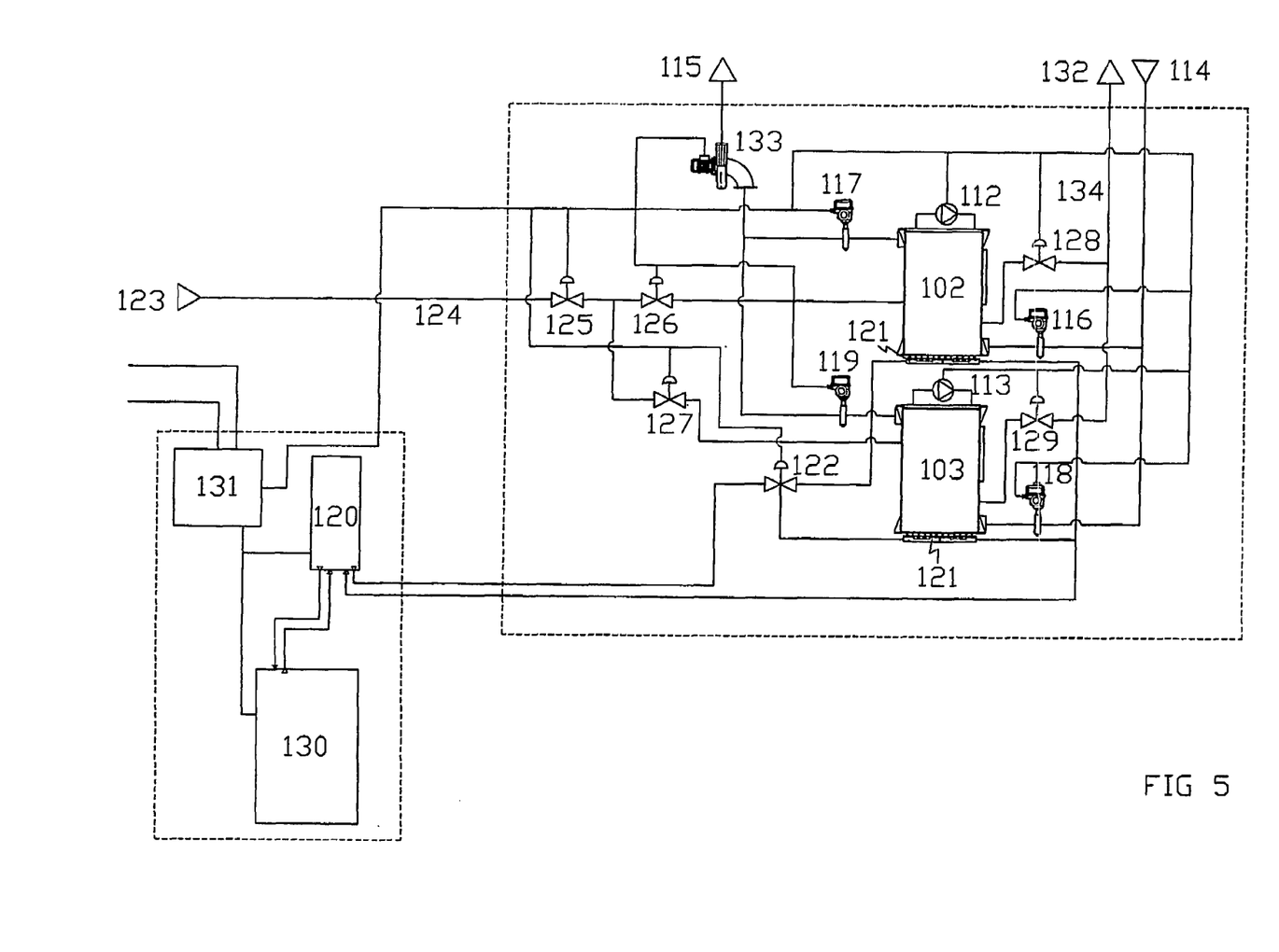
FIG. 5 is a process diagram representing a device for removing carbon dioxide from the air of an air raid shelter.

The process diagram in FIG. 5 represents a device for removing carbon dioxide from the air of an air raid shelter 101. The device of FIG. 5 comprises a first filter 102 and a second filter 103. It is obvious to the skilled person that the device may also comprise more than two filters. For example, the device may comprise a third filter (not shown in the figures) and a fourth filter (not shown in the figures). In addition, the first filter 102 and/or the second filter 103 may be divided into filter components (not shown in the figures). The first filter 102 and the second filter 103 contain regenerable adsorbent 104 capable of adsorbing carbon dioxide, which in the figures is placed in the filter casing 105.

Figure 6:
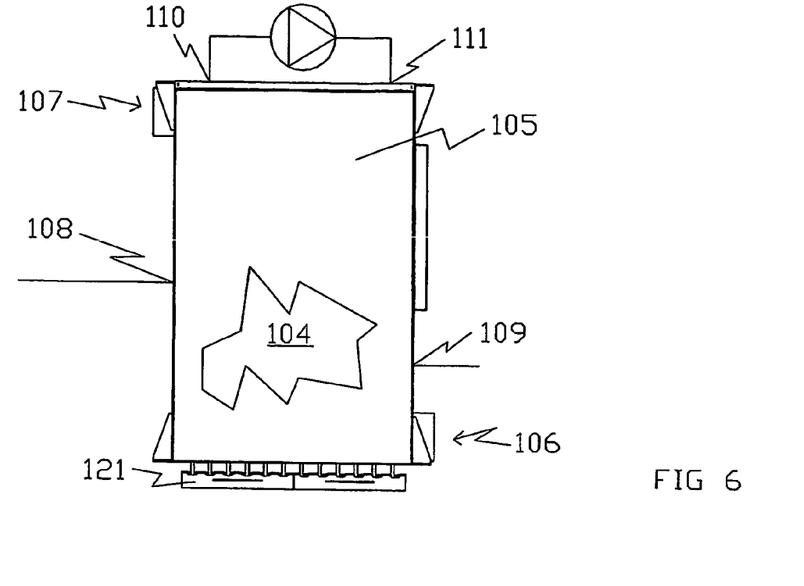
FIG. 6 presents a partly sectional view of a filter.

The filter presented in FIG. 6, which may be the first filter 103 or the second filter 103 of the device in FIG. 5, comprises a first inlet port 106 for the admission of an air flow to be cleaned of carbon dioxide into the filter casing 105, which contains regenerable adsorbent 104 capable of adsorbing carbon dioxide. The filter presented in FIGS. 5 and 6 additionally comprises a first outlet port 107 for removing the air flow at least partially cleaned of carbon dioxide from the filter casing 105.

The filter in FIG. 6 may be either the first filter 102 or the second filter 1103 of the device, and it additionally comprises a second inlet port 108 for the admission of a purification gas to be described later on into the filter casing 105 and a second outlet port 109 for passing the carbon dioxide-containing purification gas out of the filter casing 105.

The filter presented in FIG. 6, which may be either the first filter 102 or the second filter 103 of the device, additionally comprises a first air circulation port 110 and a second air circulation port 111, to which ports the second fan 112 in the first filter 102 of the device presented in FIG. 5 and the third fan 113 in the second filter 103 of the device presented in FIG. 5 are connected.

The device of FIG. 5 additionally comprises a regeneration arrangement (not indicated by a reference number) for desorbing, i.e. releasing the carbon dioxide adsorbed in the regenerable carbon dioxide-adsorbing adsorbent 104 of the first filter 102 from the adsorbent 104 of the first filter 102 and for desorbing, i.e. releasing the carbon dioxide adsorbed in the regenerable carbon dioxide-adsorbing adsorbent 104 of the second filter 103 from the adsorbent 104 of the second filter 103.

The device additionally comprises air flow means (not indicated by a reference number)

i) for passing the air flow to be cleaned of carbon dioxide from the air raid shelter 101 to the first filter 102, through the first filter 102 so that carbon dioxide is adsorbed into the adsorbent 104 of the first filter 102 and for passing the air at least partially cleaned of carbon dioxide out from the first filter 102 and further into the air raid shelter 101.

ii) for preventing the air flow to be cleaned of carbon dioxide from getting to the first filter 102 and for preventing the air at least partially cleaned of carbon dioxide from getting out from the first filter 102 and further into the air raid shelter 101, iii) for passing the air flow to be cleaned of carbon dioxide from the air raid shelter 101 to the second filter 103, through the second filter 103 so that carbon dioxide is adsorbed into the adsorbent 104 of the second filter 103, and for passing the air at least partially cleaned of carbon dioxide out from the second filter 103 and further into the air raid shelter 101, and iv) for preventing the air flow to be cleaned of carbon dioxide from getting to the second filter 103 and for preventing the air at least partially cleaned of carbon dioxide from getting out from the second filter 103 and further into the air raid shelter 101.

In the device of the invention, by utilizing the air flow means, an air flow can be passed from the air raid shelter 101 to the first filter 102 to clean the said air flow at least partially of carbon dioxide by means of the first filter 102, and by utilizing the air flow means an air flow at least partially cleaned of carbon dioxide can be passed from the first filter 102 and further into the air raid shelter 101 while at the same time the air flow means have been fitted to prevent air from flowing from the air raid shelter 101 to the second filter 103 and to prevent air from flowing out from the second filter 103 and further into the air raid shelter while carbon dioxide can be desorbed from the adsorbent 104 of the second filter 103 by the regeneration arrangement.

In a corresponding manner, in the device of the invention, by utilizing the air flow means, an air flow can be passed from the air raid shelter 101 to the second filter 103 to clean the said air flow at least partially of carbon dioxide by means of the second filter 103, and by utilizing the air flow means an air flow at least partially cleaned of carbon dioxide can be passed from the second filter 103 and further into the air raid shelter 101 while at the same time the air flow means have been fitted to prevent air from flowing from the air raid shelter 101 to the first filter 102 and to prevent air from flowing out from the first filter 102 and further into the air raid shelter while carbon dioxide can be desorbed from the adsorbent 104 of the first filter 102 by the regeneration arrangement.

In the device presented in FIG. 5, the air flow means comprise a first valve 116, which in its open position has been fitted to allow air to flow from the air raid shelter 101 via the air inlet port 114 to the first filter 102, and which in its closed position has been fitted to prevent air from flowing to the first filter 103.

In the device presented in FIG. 5, the air flow means additionally comprise a third valve 118, which in its open position has been fitted to allow air to flow from the air raid shelter 101 via the air inlet port 114 to the second filter 103, and which in its closed position has been fitted to prevent air from flowing to the second filter 103.

In the device presented in FIG. 5, the air flow means additionally comprise a second valve 117, which in its open position has been fitted to allow air to flow out from the first filter 102 and which in its closed position has been fitted to prevent air from flowing out from the first filter 102 and through the air outlet port 115 into the air raid shelter 101.

In the device presented in FIG. 5, the air flow means additionally comprise a fourth valve 119, which in its open position has been fitted to allow air to flow out from the second filter 103 and which in its closed position has been fitted to prevent air from flowing out from the second filter 103 and through the air outlet port 115 into the air raid shelter 101.

The regenerable carbon dioxide-adsorbing adsorbent 104 in the first filter 102 and in the second filter 103 preferably but not necessarily comprises an amine or an amine compound, which preferably but not necessarily is slightly alkaline.

The regenerable carbon dioxide-adsorbing adsorbent 104 in the first filter 102 and in the second filter 103 is an adsorbent 104 such that carbon dioxide has been arranged to be adsorbed into the adsorbent 104 when the temperature of the adsorbent 104 is within an adsorption temperature range and that the carbon dioxide adsorbed into the adsorbent 104 has been arranged to be at least partially desorbed from the adsorbent 104 when the adsorbent 104 is heated to a temperature above the adsorption temperature range of the adsorbent 104.

The regenerable carbon dioxide-adsorbing adsorbent 104 in the first filter 102 and in the second filter 103 is preferably but not necessarily such that in a given adsorption temperature range it has been adapted to adsorb carbon dioxide by forming, depending on the amine or amine compound used, e.g. carbonic acid ($H_2CO_3$) from the water ($H_2O$) and carbon dioxide ($CO_2$) present in the air to be filtered and which at a temperature above the aforesaid adsorption temperature range has been adapted to form water and carbon dioxide from the carbonic acid and to desorb the carbon dioxide.

For example, there is a known amine group which, depending on the temperature of the amine, reacts with carbon dioxide ($CO_2$) as follows:

If the temperature of the amine is within the so-called adsorption temperature range, the reaction proceeds in the direction shown below:

in other words, carbon dioxide reacts with water and the product is carbonic acid, which can be adsorbed (bound) to the adsorbent 104 in the first filter 102 or in the second filter 103.

If the temperature of the amine is increased above the so-called adsorption temperature range or decreased below the so-called adsorption temperature range, or if the pressure prevailing the first filter 102 or in the second filter 103 is reduced, the reaction will proceed in the direction shown below:

in other words, carbonic acid is converted back into water and carbon dioxide and the carbon dioxide is released from the adsorbent 104.

An example of regenerable carbon dioxide-adsorbing adsorbent 104 that, depending on the temperature of the adsorbing material, either binds carbon dioxide or releases carbon dioxide bound in it is DOR-SA-028, manufactured by Bayer AG.

The regeneration arrangement of the device comprises a heating arrangement (not indicated by a reference number) for heating the adsorbent 104 of the first filter 102 and the second filter 103 e.g. to a temperature of 50-200° C., more preferably to a temperature of 70-110° C., most preferably to a temperature of 80-85° C.

The heating arrangement of the device comprises a heating device 120 for heating a fluid (not shown) and a closed fluid circulation system 121 for circulating the fluid heated by the heating device 120 through the first filter 102 and the second filter 103 so that the adsorbent 104 of the first filter 102 and the second filter 103 can be heated.

The device presented in FIG. 5 additionally comprises conduits (not indicated by a reference number) for conducting the fluid heated by the heating device 120 between the heating device 120 and the closed fluid circulation system 121 of the first filter 102. The device presented in FIG. 5 additionally comprises conduits for conducting the fluid heated by the heating device 120 between the heating device 120 and the closed fluid circulation system 121 of the second filter 103.

The fluid is preferably but not necessarily water with an alcohol, such as e.g. glycol, mixed in it.

The heating arrangement of the device presented in FIG. 5 additionally comprises a fluid valve 122, which has been fitted to optionally direct the fluid coming from the heating device 120 either into the closed fluid circulation system 121 of the first filter 102 or into the closed fluid circulation system 121 of the second filter 103 so that either the first filter 102 or the second filter 103 can be heated so that the adsorbent 104 of either the first filter 102 or the second filter 103 is heated and the carbon dioxide adsorbed in it is at least partially desorbed from the adsorbent 104.

The device presented in FIG. 5 additionally comprises purification gas supply means (not indicated by a reference number) for supplying a purification gas (not shown) optionally either into the first filter 102 or into the second filter 103 after the heating device 120 has heated the adsorbent 104 of the first filter 102 or the second filter 103 respectively to a temperature above the adsorption temperature range of the adsorbent 104 and the carbon dioxide has been at least partially desorbed from the adsorbent 104 and for mixing the carbon dioxide desorbed from the adsorbent 104 into the gas.

The purification gas is preferably but not necessarily nitrogen and the gas supply means preferably comprise a nitrogen storage 123, where the nitrogen is preferably but not necessarily stored in a pressurized state. It is also possible to use the air of the air raid shelter 101 as a purification gas.

In FIG. 5, the purification gas supply means comprise purification gas supply conduits 124 for conducting the purification gas from the nitrogen storage 123 optionally either into the first filter 102 or into the second filter 103.

Fitted in the purification gas supply conduits 124 is a main purification gas valve 125, which in its open position permits the flow of nitrogen from the nitrogen storage 123.

Fitted in the purification gas supply conduits 124 is additionally a first purification gas valve 126, which in its open position permits the flow of purification gas into the first filter 102 and which in its closed position prevents the purification gas from flowing into the first filter 102.

Fitted in the purification gas supply conduits 124 is additionally a second purification gas valve 127, which in its open position permits the flow of purification gas into the second filter 103 and which in its closed position prevents the purification gas from flowing into the second filter 103.

The device presented in FIG. 5 additionally comprises purification gas outlet means (not indicated by a reference number) for conducting the carbon dioxide containing purification gas out from the first filter 102 or from the second filter 103, respectively.

In FIG. 5, the purification gas outlet means comprise purification gas outlet conduits 134 for conducting the purification gas optionally either into the first filter 102 or into the second filter 103.

Fitted in the purification gas outlet conduits 134 is additionally a third purification gas valve 128, which in its open position permits the flow of carbon dioxide-containing purification gas out from the first filter 102 and which in its closed position prevents the purification gas form flowing out from the first filter 102.

Fitted in the purification gas outlet conduits 134 is additionally a fourth purification gas valve 129, which in its open position permits the flow of carbon dioxide-containing purification gas out from the second filter 103 and which in its closed position prevents the purification gas form flowing out from the second filter 103.

Figure 7:
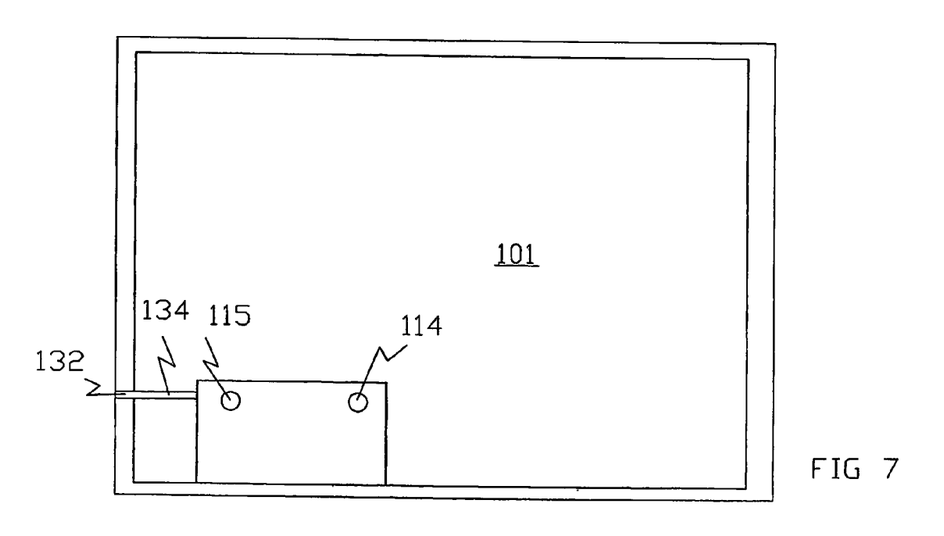
FIG. 7 presents an air raid shelter provided with a device for removing carbon dioxide.

In the air raid shelter 101 presented in FIG. 7, the purification gas outlet means, i.e. the purification gas outlet conduits 134 have been fitted to conduct the carbon dioxide-containing purification gas through a pressure valve 132 provided in the wall of the air raid shelter to the outside of the air raid shelter 101.

If the regenerable carbon dioxide-adsorbing adsorbent is an adsorbent 104 that has been adapted to adsorb carbon dioxide in a given adsorption temperature range, then the device preferably but not necessarily comprises a cooling arrangement (not indicated by a reference number) for reducing the temperature of the adsorbent 104 of the first filter 102 and the second filter 103 from a temperature above the adsorption temperature range of the adsorbent 104 to a temperature within the adsorption temperature range of the adsorbent 104 or to a temperature below a temperature within the adsorption temperature range, e.g. to a temperature of 10-50° C., more preferably to a temperature of 20-40° C., most preferably to a temperature of 20-30° C.

In FIG. 5, the cooling arrangement comprises a cooling device 130 for cooling the fluid and a closed fluid circulation system 121 for circulating the fluid cooled by the cooling device 130 through the first filter 102 and the second filter 103. The cooling device 130 preferably but not necessarily comprises a fluid circulation pump (not shown in the figures) for circulating the fluid in the closed fluid circulation system 121 in the first filter 102 and the second filter 103.

The device presented in FIG. 5 additionally comprises conduits (not indicated by a reference number) for conducting the fluid cooled by the cooling device 130 between the cooling device 130 and the closed fluid circulation system 121 of the first filter 102 and correspondingly conduits for circulating the fluid cooled by the cooling device 130 between the cooling device 130 and the closed fluid circulation system 121 of the second filter 103.

The fluid in preferably but not necessarily water with an alcohol, such as e.g. glycol, mixed in it.

The cooling arrangement additionally comprises a fluid valve 122, which has been fitted to optionally direct the fluid coming from the cooling device 130 either into the closed fluid circulation system 121 of the first filter 102 or into the closed fluid circulation system 121 of the second filter 103 so that either the first filter 102 or the second filter 103 can be cooled so that the temperature of the adsorbent 104 in either the first filter 102 or the second filter 103 is reduced from a temperature above the adsorption temperature range of the adsorbent 104 to a temperature within the adsorption temperature range of the adsorbent 104 or to a temperature below a temperature within the adsorption temperature range.

The cooling fluid is preferably but not necessarily water that contains a cooling liquid, such as e.g. glycol.

In the device presented in FIG. 5, the heating arrangement and the cooling arrangement are combined so that the same conduits are used for conducting the fluid between the heating device 120 and the first filter 102/second filter 103 and between the cooling device 130 and the first filter 102/second filter 103. In the device presented in FIG. 5, the heating arrangement and the cooling arrangement are additionally combined so that in the first filter 102 the same closed fluid circulation system 121 is used for circulating in the first filter the fluid heated by the heating device 120 and for circulating the fluid cooled by the cooling device 130 and so that in the second filter 103 the same closed fluid circulation system 121 is used for circulating in the second filter 103 the fluid heated by the heating device 120 and the fluid cooled by the cooling device 130.

The first filter 102 preferably but not necessarily comprises a second fan 112 for equalizing the temperature in the first filter 102.

The second filter 103 preferably but not necessarily comprises a third fan 113 for equalizing the temperature in the second filter 103.

The device presented in FIG. 5 additionally comprises a first fan 133 for creating an air flow in the device.

OPERATING EXAMPLE

In the following, the device presented in FIG. 5 will be described using an operating example.
1. The first fan 133 is started.
2. The first valve 116 and the second valve 117 are opened and the third valve 118 and the fourth valve 119 are closed. Carbon dioxide-containing air is drawn through the inlet port 114 into the device and via the first valve 116 through the first filter 102, and the air at least partially cleaned of carbon dioxide is blown out from the device via the second valve 117 and further into the air raid shelter 101 via the air outlet port 115. Carbon dioxide is adsorbed into the adsorbent 104 of the first filter 102 when the carbon dioxide-containing air flows through the first filter 102.
3. The first valve 116 and the second valve 117 are closed and the third valve 118 and the fourth valve 119 are opened. Carbon dioxide-containing air is drawn via the air inlet port into the device and further via the third valve 118 through the second filter 103 and air at least partially cleaned of carbon dioxide is blown out from the device via the fourth valve 119 and further into the air raid shelter 101 via the air outlet port 115. Carbon dioxide is adsorbed into the adsorbent 104 of the second filter 103 when carbon dioxide-containing air is flowing through the second filter 103.
4. During the step described in paragraph 3, the adsorbent 104 of the first filter 102 is simultaneously heated by activating the fluid circulation pump of the heating device 120 and opening the fluid valve 122 and setting it into a position such that the fluid heated by the heating device 120 can flow through the closed fluid circulation system 121 of the first filter 102 so that the adsorbent 104 of the first filter 102 is heated to a temperature above the adsorption temperature range, as a consequence of which carbon dioxide is at least partially released from the adsorbent 104 of the first filter 102. At the same time, the second fan 112 is operated so as to cause the heat to be well distributed throughout the first filter 102.
5. After this, the third purification gas valve 128, the main purification gas valve 125 and the first purification gas valve 126 are opened and nitrogen flows from the nitrogen storage 123 via the main purification gas valve 125 and the first purification gas valve 126 into the first filter 102, where the carbon dioxide has been at least partially released from the adsorbent 104. In the first filter 102, carbon dioxide is mixed in the nitrogen gas, and carbon dioxide-containing nitrogen gas flows out from the first filter 102 and further via the third purification gas valve 128 and the pressure valve 132 out from the air raid shelter 101.
6. After this, the first filter 102 is cooled by activating the fluid circulation pump of the cooling device 130 and opening the fluid valve 122 and setting it into a position such that the cooling fluid cooled by the cooling device 130 can flow through the closed fluid circulation system 121 of the first filter 102 so that the temperature of the adsorbent 104 of the first filter 102 is reduced from a temperature above the adsorption temperature range to a temperature within the adsorption temperature range. At the same time, the second fan 112 is operated so as to cause the heat to be well distributed throughout the first filter 102.
7. After this, the first filter 102 is ready to function as a carbon dioxide filter and the second filter 103 can be cleaned.
8. The air to be cleaned of carbon dioxide is caused to flow through the first filter 102 by closing the third valve 118 and the fourth valve 119 and opening the first valve 116 and the second valve 117. Carbon dioxide-containing air is drawn via the air inlet port into the device and further via the first valve 116 through the first filter 102, and air at least partially cleaned of carbon dioxide is blown out from the device via the second valve 117 and further into the air raid shelter 101 via the air outlet port 115. Carbon dioxide is adsorbed into the adsorbent 104 of the first filter 102 as the carbon dioxide-containing air is flowing through the first filter 102.

9. The adsorbent 104 of the second filter 103 is heated by activating the fluid circulation pump of the heating device 120 and opening the fluid valve 122 and setting it to a position such that the fluid heated by the heating device 120 can flow through the closed fluid circulation system 121 of the second filter 103 so that the adsorbent 104 of the second filter 103 is heated to a temperature above the adsorption temperature range, with the result that carbon dioxide is at least partially released from the adsorbent of the second filter 103. At the same time, the third fan 113 is opened so as to cause the heat to be well distributed throughout the second filter 103.

10. Next, the fourth purification gas valve 129, the main purification gas valve 125 and the second purification gas valve 127 are opened and nitrogen flows from the nitrogen storage 123 via the main purification gas valve 125 and the second purification gas valve 127 into the second filter 103, where the carbon dioxide has been at least partially released from the adsorbent 104. In the second filter 103, carbon dioxide is mixed into the nitrogen gas, and carbon dioxide-containing nitrogen gas flows out from the second filter 103 and further via the fourth purification gas valve 129 and the pressure valve 132 out from the air raid shelter 101.

11. After this, the second filter 103 is cooled by activating the fluid circulation pump of the cooling device 130 and opening the fluid valve 122 and setting it to a position such that the cooling fluid cooled by the cooling device 130 can flow through the closed fluid circulation system 121 of the second filter 103 so that the temperature of the adsorbent 104 of the second filter 103 is reduced from a temperature above the adsorption temperature range to a temperature within the adsorption temperature range. At the same time, the third fan 113 is operated so as to cause the heat to be well distributed throughout the second filter 103.

12. After this, the second filter 103 is ready to function as a carbon dioxide filter and the process is continued from step 3.

The device additionally comprises a power and control device 131, which has been fitted to control the operation of each valve and each fan of the device and to control the heating device 120 and the cooling device 130 in accordance with a predetermined cycle, e.g. in accordance with the cycle described in the above operating example.

It is obvious to the person skilled in the art that, with the progress of technical development, the fundamental concept of the invention can be implemented in many different ways. The invention and its embodiments are therefore not limited to the example described above, but they may be varied within the scope of the claims.

LIST OF REFERENCE NUMBERS

10 Filter device
11 Ceiling
12 Body casing
13 Filter
14 Inlet port
15 Fan
16 Outlet slot
17 Auxiliary filter
18 Valve
19 Outlet flue
20 Electric resistor
21 Table
22 Rod
23 Knob
24 Room air
101 Air raid shelter
102 First filter
103 Second filter
104 Adsorbent
105 Filter casing
106 First inlet port
107 First outlet port
108 Second inlet port
109 Second outlet port
110 First air circulation port
111 Second air circulation port
112 Second fan
113 Third fan
114 Air inlet port
115 Air outlet port
116 First valve
117 Second valve
118 Third valve
119 Fourth valve
120 Heating device
121 Closed fluid circulation system
122 Fluid valve
123 Pressure vessel
124 Purification gas supply conduits
125 Main purification gas valve
126 First purification gas valve
127 Second purification gas valve
128 Third purification gas valve
129 Fourth purification gas valve
130 Cooling device
131 Power and control device
132 Pressure valve
133 Fan
134 Purification gas outlet conduits

The invention claimed is:

1. A filtering method for removing impurities from air (24) circulating within a limited space, such as a room, an air raid shelter or a vehicle, according to which filtering method the air (24) to be filtered containing carbon dioxide and impurities generated within the limited space is passed through a filter (13), whereby at least a portion of the carbon dioxide and impurities in the air is trapped in the filter, and after the filtering, the filter (13) is regenerated to remove the carbon dioxide and impurities trapped in the filter by passing a gaseous regenerating medium through the filter, characterized in that the filter (13) is a carbon dioxide filter (13) for trapping and removing carbon dioxide and the air (24) to be filtered is passed through the carbon dioxide filter (13), so that at least a portion of the carbon dioxide in the air is trapped in the filter and removed from the air (24), and after the filtering, the carbon dioxide filter (13) is regenerated by removing the carbon dioxide trapped in the filter by a technique whereby air (24) that, prior to being conducted to the filter, has been heated to a temperature of 50-200° C., is passed through the filter.

2. A filtering method according to claim 1, wherein the carbon dioxide filter traps and removes particles including mold spores and cigarette smoke from the air of the limited space.

3. A filtering method according to claim 1, characterized in that the carbon dioxide filter (13) is regenerated by passing through it unpurified air (24) generated within said limited space, and that prior to being fed into the filter, the air is heated to a temperature of 50-200° C.

4. A filtering method according to claim 1, wherein in the step of regenerating the carbon dioxide filter (13), the heated air (24) passed through the filter from said limited space, and together with it the carbon dioxide and/or particles are removed into outdoor air.

5. A filtering method according to claim 1, comprising removing the carbon dioxide filter from said limited space and passing outdoor air through the filter that, prior to being fed into the filter, is heated to a temperature of 50-200° C.

6. A filter device (10) for removing impurities from air (24) circulating within a limited space, such as a room, an air raid shelter or a vehicle, said filter device comprising
  a filter (13),
  a first opening (14) for admitting the air (24) of the space to be filtered into the filter (13),
  a second opening (16) for passing the air filtered through the filter (13) back into the air space of the space to be filtered,
  an operating device (15) for driving the air through the filter (13), and
  regenerating equipment for regenerating the filter (13) with a gaseous medium,
characterized in
  that the filter (13) of the filter device (10) is a carbon dioxide filter (13) for trapping and removing carbon dioxide and through which the air (24) of the space to be filtered containing carbon dioxide and/or particulate impurities can be passed,
  that the regenerating equipment of the filter device (10) comprises
  a heating element (20) for heating the air (24),
  a first channel (14) for passing the air to the heating element (20),
  a second channel for passing the heated air to the carbon dioxide filter (13),
  an operating device (15) for setting the heated air in motion through the carbon dioxide filter (13),
  and an opening (16, 19) for passing the heated air and together with it the carbon dioxide and/or particulate impurities released from the carbon dioxide filter (13) out from the filter device (10).

7. A filter device (10) according to claim 6, wherein the filter device (10) comprises an opening (16, 19) for passing the heated air and together with it the carbon dioxide and/or particles released from the carbon dioxide filter (13) into outdoor air.

8. A filter device (10) according to claim 6, wherein the filter device (10) comprises a valve (18) through which the carbon dioxide filter (13) can be connected either to the aforesaid second opening (16) for passing the filtered air back into the air space of the space to be filtered or to the aforesaid third opening (19) for passing the heated air and together with it the carbon monoxide and/or particles released from the carbon dioxide filter (13), out from the filter device (10).

9. A filter device (10) according to claim 6, wherein opening (16) of the filter device for delivering the heated air and the carbon monoxide and/or particles released from the carbon dioxide filter (13) into outer air is the same as the opening for passing the filtered air back into the air space of the space to be filtered.

10. A filter device (10) according to claim 6, wherein the device is configured such that during the regeneration step, the air (24) of the space to be filtered can be passed to the filter (13) via the first opening (14) and the first channel (14) and the heating element (20).

11. A filter device (10) according to claim 6, characterized in
  that the carbon dioxide filter (13) of the filter device (10) is mainly composed of a powdery material, which is a substance capable of trapping carbon dioxide,
  and that, besides the carbon dioxide filter (13), the filter device (10) comprises an auxiliary filter (17) for pre-filtering the air to be passed to the carbon dioxide filter.

12. A device for removing carbon dioxide from the air of an air raid shelter (101), said device comprising
  a first filter (102) containing regenerable carbon dioxide-adsorbing adsorbent (104),
  a second filter (103) containing regenerable carbon dioxide-adsorbing adsorbent (104),
  air flow means
  i) for passing the air flow to be cleaned of carbon dioxide from the air raid shelter (101) to the first filter (102), through the first filter (102) so that carbon dioxide is adsorbed into the regenerable carbon dioxide-adsorbing adsorbent (104) of the first filter (102) and for passing the air at least partially cleaned of carbon dioxide out from the first filter (102) and further into the air raid shelter (101),
  ii) for preventing the air flow to be cleaned of carbon dioxide from getting from the air raid shelter (101) into the first filter (102) and for preventing the air at least partially cleaned of carbon dioxide from getting out from the first filter (102) and further into the air raid shelter (101),
  iii) for passing the air flow to be cleaned of carbon dioxide from the air raid shelter (101) into the second filter (103), through the second filter (103) so that carbon dioxide is adsorbed into the regenerable carbon dioxide-adsorbing adsorbent (104) of the second filter (103), and for passing the air at least partially cleaned of carbon dioxide out from the second filter (103) and further into the air raid shelter (101), and
  iv) for preventing the air flow to be cleaned of carbon dioxide from getting into the second filter (103) and for preventing the air at least partially cleaned of carbon dioxide from getting out from the second filter (103) and further into the air raid shelter (101),
  and a regeneration arrangement for desorbing from the adsorbent (104) of the first filter (102) the carbon dioxide adsorbed in the adsorbent (104) of the first filter (102) and for removing it from the first filter (102), and for desorbing from the adsorbent (104) of the second filter (103) the carbon dioxide adsorbed in the adsorbent (104) of the second filter (103) and for removing it from the second filter (103),
characterized in that the regeneration arrangement comprises a heating arrangement comprising a heating device (120) for heating a fluid, and a closed fluid circulation system (121)
  i) for conducting the fluid heated by the heating device (120) in the closed fluid circulation system (121) through the first filter so that the adsorbent (104) of the first filter (102) is heated and carbon dioxide is desorbed from the adsorbent (104) of the first filter (102), and
  ii) for conducting the fluid heated by the heating device (120) in the closed fluid circulation system (121) through the second filter (103) so that the adsorbent (104) of the second filter (103) is heated and carbon dioxide is desorbed from the adsorbent (104) of the second filter (103).

13. A device according to claim 12, characterized in that the adsorbent (104) comprises an amine or amine compound, which preferably but not necessarily is slightly alkaline.

14. A device according to claim 12, characterized in that the heating device (120) have been fitted to heat the adsorbent (104) of the first filter (102) and the second filter (103) to a temperature of 50-200° C., more preferably to a temperature of 70-110° C., most preferably to a temperature of 80-85° C.

15. A device according to claim 12, characterized in that the regeneration arrangement comprises a cooling device (130) for reducing the temperature of the adsorbent (104) of the first filter (102) and the second filter (103).

16. A device according to claim 15, characterized in
that the cooling device (130) has been fitted to cool the fluid,
that the cooling device (130) has been fitted to feed the fluid cooled by the cooling device (130) into the closed fluid circulation system (121) to conduct the fluid cooled by the cooling device (130) in the closed fluid circulation system (121) through the first filter (102), and
that the cooling device (130) has been fitted to feed the fluid cooled by the cooling device (130) into the closed fluid circulation system (121) to conduct the fluid cooled by the cooling device (130) in the closed fluid circulation system (121) through the second filter (103).

17. A device according to claim 15, characterized in that the cooling device (130) has been fitted to cool the adsorbent (104) of the first filter (102) and the second filter (103) to a temperature of 10-50° C., more preferably to a temperature of 20-40° C., most preferably to a temperature of 20-30° C.

18. A device according to claim 12, characterized in that the fluid is water with an alcohol, such as e.g. glycol, mixed in it.

19. A device according to claim 12, characterized in that the regeneration arrangement comprises
purification gas supply means for supplying a purification gas into the first filter (102) to mix the carbon dioxide desorbed from the adsorbent (104) into the purification gas,
purification gas supply means for supplying a purification gas into the second filter (103) to mix the carbon dioxide desorbed from the adsorbent (104) into the purification gas,
purification gas outlet means for conducting the carbon dioxide-containing purification gas out from the first filter (102), and
purification gas outlet means for conducting the carbon dioxide-containing purification gas out from the second filter (103).

20. A device according to claim 19, characterized in that the purification gas supply means comprise a pressure vessel (123), from which the purification gas can be fed into the first filter (102) and the second filter (103).

21. A device according to claim 19, characterized in that the purification gas is nitrogen.

22. A method according to claim 1, wherein in the step of regenerating the carbon dioxide filter (13), air that is passed through the filter is heated to a temperature of 70-80° C.

23. A method according to claim 3, wherein in the step of regenerating the carbon dioxide filter (13), air that is passed through the filter is heated to a temperature of 70-80° C.

24. A method according to claim 5, wherein in the step of regenerating the carbon dioxide filter (13), the outdoor air that is passed through the filter is heated to a temperature of 70-80° C.

* * * * *